United States Patent
Konishi

(10) Patent No.: US 12,054,144 B2
(45) Date of Patent: Aug. 6, 2024

(54) ROAD INFORMATION GENERATION APPARATUS

(71) Applicant: Honda Motor Co., Ltd., Tokyo (JP)

(72) Inventor: Yuichi Konishi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 277 days.

(21) Appl. No.: 17/676,184

(22) Filed: Feb. 20, 2022

(65) Prior Publication Data

US 2022/0266824 A1     Aug. 25, 2022

(30) Foreign Application Priority Data

Feb. 24, 2021   (JP) .................................. 2021-027083

(51) Int. Cl.
*B60W 30/10*       (2006.01)
*G06V 20/56*       (2022.01)
*G06V 20/58*       (2022.01)

(52) U.S. Cl.
CPC ............ *B60W 30/10* (2013.01); *G06V 20/584* (2022.01); *G06V 20/588* (2022.01); *B60W 2552/53* (2020.02); *B60W 2554/4049* (2020.02)

(58) Field of Classification Search
CPC ............. B60W 30/10; B60W 2552/53; B60W 2554/4049; G06V 20/584; G06V 20/588
See application file for complete search history.

(56) References Cited

U.S. PATENT DOCUMENTS

| | | | |
|---|---|---|---|
| 2016/0318490 A1* | 11/2016 | Ben Shalom | B60K 31/0008 |
| 2020/0167574 A1 | 5/2020 | Kumano et al. | |
| 2022/0258737 A1* | 8/2022 | Ariyoshi | B60W 50/14 |

FOREIGN PATENT DOCUMENTS

| | | |
|---|---|---|
| CN | 111223315 A | 6/2020 |
| JP | 2018005629 A | 1/2018 |

OTHER PUBLICATIONS

Chinese office action; Application 202210130026.2; May 13, 2023.

* cited by examiner

*Primary Examiner* — Michael D Lang
(74) *Attorney, Agent, or Firm* — Duft & Bornsen, PC

(57) ABSTRACT

A road information generation apparatus includes: an in-vehicle detection unit configured to detects a situation around a subject vehicle; and a microprocessor and a memory connected to the microprocessor. The microprocessor is configured to perform: recognizing a position of the subject vehicle; recognizing a travel lane of the subject vehicle and a traffic light corresponding to the travel lane of the subject vehicle, installed at an intersection, before the subject vehicle enters the intersection, based on a detection data detected by the in-vehicle detection unit and the position of the subject vehicle recognized in the recognizing, when the intersection is recognized ahead in a traveling direction of the subject vehicle, based on the detection data detected by the in-vehicle detection unit; and generating a road information associating the traffic light recognized in the recognizing the traffic light with the travel lane of the subject vehicle.

12 Claims, 5 Drawing Sheets

ROAD INFORMATION GENERATION APPARATUS

CROSS-REFERENCE TO RELATED APPLICATION

This application is based upon and claims the benefit of priority from Japanese Patent Application No. 2021-027083 filed on Feb. 21, 2021, the content of which are incorporated herein by reference.

BACKGROUND OF THE INVENTION

Field of the Invention

This invention relates to a road information generation apparatus configured to generate an information of a road on which a vehicle travels.

Description of the Related Art

As this type of device, there has been conventionally known a device configured to capture an image of the front of a vehicle with a camera mounted on the traveling vehicle, accumulate the captured image, and generate, based on the accumulated captured image, road information that associates a lane with a traffic light corresponding to the lane (see, for example, JP 2018-005629A (JP 2018-005629 A1)).

However, in the case of generating road information as mentioned above, based on accumulated captured images as in the device described in JP 2018-005629 A1, there is a need to store the captured image until the road information is generated, and there is a possibility that the capacity of the memory device is greatly used.

SUMMARY OF THE INVENTION

An aspect of the present invention is a road information generation apparatus including: an in-vehicle detection unit configured to detects a situation around a subject vehicle; and a microprocessor and a memory connected to the microprocessor. The microprocessor is configured to perform: recognizing a position of the subject vehicle; recognizing a travel lane of the subject vehicle and a traffic light corresponding to the travel lane of the subject vehicle, installed at an intersection, before the subject vehicle enters the intersection, based on a detection data detected by the in-vehicle detection unit and the position of the subject vehicle recognized in the recognizing, when the intersection is recognized ahead in a traveling direction of the subject vehicle, based on the detection data detected by the in-vehicle detection unit; and generating a road information associating the traffic light recognized in recognizing the traffic light with the travel lane of the subject vehicle.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

An embodiment of the present invention will be described below with reference to FIGS. 1 to 4. The road information generation apparatus according to the embodiment of the present invention can be applied to a vehicle that has a self-driving capability, that is, a self-driving vehicle. Note that a vehicle to which the road information generation apparatus according to the present embodiment is applied may be referred to as a subject vehicle to be distinguished from other vehicles. Note that the subject vehicle may be any of an engine vehicle having an internal combustion engine as a traveling drive source, an electric vehicle having a traveling motor as a traveling drive source, and a hybrid vehicle having an engine and a traveling motor as traveling drive sources. The subject vehicle can travel not only in a self-drive mode in which a driving operation by a driver is unnecessary, but also in a manual drive mode by the driving operation by the driver.

Figure 1:
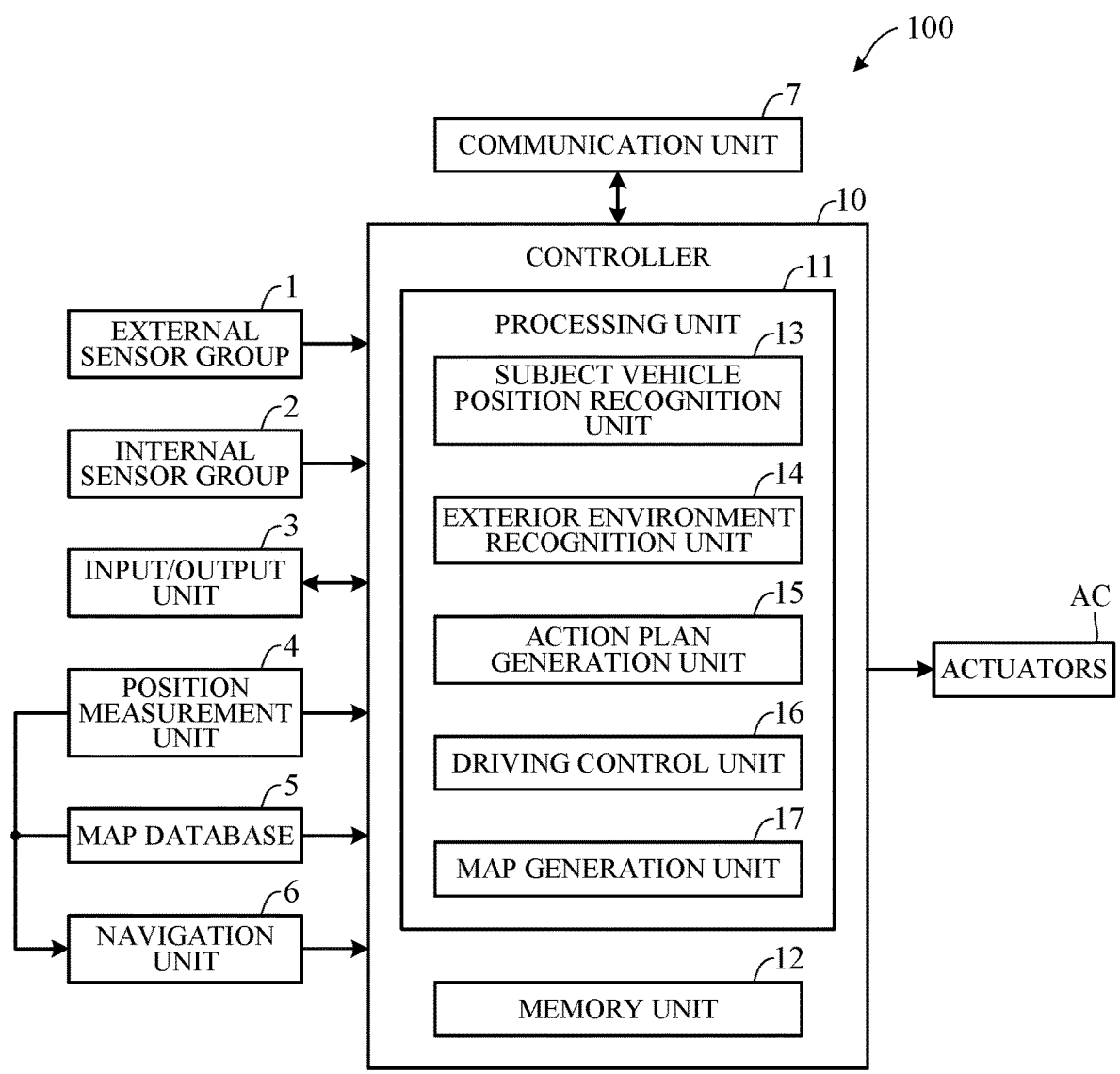
FIG. 1 is a block diagram schematically illustrating an overall configuration of a vehicle control system according to an embodiment of the present invention.

First, a schematic configuration related to self-driving will be described. FIG. 1 is a block diagram schematically illustrating an overall configuration of a vehicle control system 100 including a road information generation apparatus according to the present embodiment of the present invention. As illustrated in FIG. 1, the vehicle control system 100 mainly includes a controller 10, an external sensor group 1, an internal sensor group 2, an input/output device 3, a position measurement unit 4, a map database 5, a navigation unit 6, a communication unit 7, and a traveling actuator AC each communicably connected to the controller 10.

The external sensor group 1 is a generic term for a plurality of sensors (external sensors) that detect an external situation which is peripheral information of a subject vehicle. For example, the external sensor group 1 includes a LiDAR that measures scattered light with respect to irradiation light in all directions of the subject vehicle and measures a distance from the subject vehicle to a surrounding obstacle, a radar that detects other vehicles, obstacles, or the like around the subject vehicle by irradiating electromagnetic waves and detecting a reflected wave, and a camera that is mounted on the subject vehicle and has an imaging element such as a CCD or a CMOS to image the periphery of the subject vehicle (forward, rearward and lateral).

The internal sensor group 2 is a generic term for a plurality of sensors (internal sensors) that detect a traveling state of the subject vehicle. For example, the internal sensor group 2 includes a vehicle speed sensor that detects a vehicle speed of the subject vehicle, an acceleration sensor that detects an acceleration in a front-rear direction of the subject vehicle and an acceleration in a left-right direction (lateral acceleration) of the subject vehicle, a rotation speed sensor that detects the rotation speed of a traveling drive source, a yaw rate sensor that detects a rotation angular speed around a vertical axis of the center of gravity of the subject vehicle, and the like. The internal sensor group 2 further includes a sensor that detects driver's driving operation in a manual drive mode, for example, operation of an accelerator pedal, operation of a brake pedal, operation of a steering wheel, and the like.

The input/output device 3 is a generic term for devices in which a command is input from a driver or information is output to the driver. For example, the input/output device 3 includes various switches to which the driver inputs various commands by operating an operation member, a microphone to which the driver inputs a command by voice, a display that provides information to the driver with a display image, a speaker that provides information to the driver by voice, and the like.

The position measurement unit (GNSS unit) 4 has a positioning sensor that receives a positioning signal transmitted from a positioning satellite. The positioning satellite is an artificial satellite such as a GPS satellite or a quasi-zenith satellite. The position measurement unit 4 measures a current position (latitude, longitude, altitude) of the subject vehicle by using the positioning information received by the positioning sensor.

The map database 5 is a device that stores general map information used in the navigation unit 6, and is constituted of, for example, a hard disk or a semiconductor element. The map information includes road position information, information on a road shape (curvature or the like), and position information on intersections and branch points. The map information stored in the map database 5 is different from highly accurate map information stored in a memory unit 12 of the controller 10.

The navigation unit 6 is a device that searches for a target route on a road to a destination input by a driver and provides guidance along the target route. The input of the destination and the guidance along the target route are performed via the input/output device 3. The target route is calculated based on a current position of the subject vehicle measured by the position measurement unit 4 and the map information stored in the map database 5. The current position of the subject vehicle can be measured using the detection values of the external sensor group 1, and the target route may be calculated on the basis of the current position and the highly accurate map information stored in the memory unit 12.

The communication unit 7 communicates with various servers (not illustrated) via a network including a wireless communication network represented by the Internet network, a mobile phone network, or the like, and acquires map information, traveling history information, traffic information, and the like from the servers periodically or at an arbitrary timing. The network includes not only a public wireless communication network but also a closed communication network provided for each predetermined management region, for example, a wireless LAN, Wi-Fi (registered trademark), Bluetooth (registered trademark), and the like. The acquired map information is output to the map database 5 and the memory unit 12, and the map information is updated.

The actuator AC is a traveling actuator for controlling traveling of the subject vehicle 101. In a case where the traveling drive source is an engine, the actuator AC includes a throttle actuator that adjusts an opening (throttle opening) of a throttle valve of the engine. In a case where the traveling drive source is a traveling motor, the actuator AC includes the traveling motor. The actuator AC also includes a brake actuator that operates a braking device of the subject vehicle and a steering actuator that drives a steering device.

The controller 10 includes an electronic control unit (ECU). More specifically, the controller 10 includes a computer including a processing unit 11 such as a CPU (microprocessor), the memory unit 12 such as a ROM and a RAM, and other peripheral circuits (not illustrated) such as an I/O interface. Although a plurality of ECUs having different functions such as an engine control ECU, a traveling motor control ECU, and a braking device ECU can be separately provided, in FIG. 1, the controller 10 is illustrated as a set of these ECUs for convenience.

The memory unit 12 stores highly accurate detailed map information (referred to as highly accurate map information). The highly accurate road map information includes road position information, information of a road shape (curvature or the like), information of a road gradient, position information of an intersection or a branch point, information of the number of lanes, width of a lane and position information for each lane (information of a center position of a lane or a boundary line of a lane position), position information of a landmark (traffic lights, signs, buildings, etc.) as a mark on a map, and information of a road surface profile such as unevenness of a road surface. The highly accurate map information stored in the memory unit 12 includes map information acquired from the outside of the subject vehicle via the communication unit 7, for example, information of a map (referred to as a cloud map) acquired via a cloud server, and information of a map created by the subject vehicle itself using detection values by the external sensor group 1, for example, information of a map (referred to as an environmental map) including point cloud data generated by mapping using a technology such as simultaneous localization and mapping (SLAM). The memory unit 12 also stores information on information such as various control programs and a threshold used in the programs.

The processing unit 11 includes a subject vehicle position recognition unit 13, an exterior environment recognition unit 14, an action plan generation unit 15, a driving control unit 16, and a map generation unit 17 as functional configurations.

The subject vehicle position recognition unit 13 recognizes the position (subject vehicle position) of the subject vehicle on a map, based on the position information of the subject vehicle, obtained by the position measurement unit 4, and the map information of the map database 5. The subject vehicle position may be recognized using the map information stored in the memory unit 12 and the peripheral information of the subject vehicle detected by the external sensor group 1, whereby the subject vehicle position can be recognized with high accuracy. When the subject vehicle position can be measured by a sensor installed on the road or outside a road side, the subject vehicle position can be recognized by communicating with the sensor via the communication unit 7.

The exterior environment recognition unit 14 recognizes an external situation around the subject vehicle based on the signal from the external sensor group 1 such as a LiDAR, a radar, and a camera. For example, the position, speed, and acceleration of a surrounding vehicle (a forward vehicle or a rearward vehicle) traveling around the subject vehicle, the position of a surrounding vehicle stopped or parked around the subject vehicle, the positions and states of other objects and the like are recognized. Other objects include signs, traffic lights, markings such as division lines and stop lines of roads, buildings, guardrails, utility poles, signboards, pedestrians, bicycles, and the like. The states of other objects include a color of a traffic light (red, green, yellow), the moving speed and direction of a pedestrian or a bicycle, and the like.

The action plan generation unit 15 generates a driving path (target path) of the subject vehicle from a current point of time to a predetermined time T ahead based on, for example, the target route calculated by the navigation unit 6, the subject vehicle position recognized by the subject vehicle position recognition unit 13, and the external situation recognized by the exterior environment recognition unit 14. When there are a plurality of trajectories that are candidates for the target path on the target route, the action plan generation unit 15 selects, from among the plurality of trajectories, an optimal trajectory that satisfies criteria such as compliance with laws and regulations and efficient and safe traveling, and sets the selected trajectory as the target path. Then, the action plan generation unit 15 generates an action plan corresponding to the generated target path. The action plan generation unit 15 generates various action plans corresponding to traveling modes, such as overtaking traveling for overtaking a preceding vehicle, lane change traveling for changing a travel lane, following traveling for following a preceding vehicle, lane keeping traveling for keeping the lane so as not to deviate from the travel lane, deceleration traveling, or acceleration traveling. When the action plan generation unit 15 generates the target path, the action plan generation unit 15 first determines a travel mode, and generates the target path based on the travel mode.

In the self-drive mode, the driving control unit 16 controls each of the actuators AC such that the subject vehicle travels along the target path generated by the action plan generation unit 15. More specifically, the driving control unit 16 calculates a requested driving force for obtaining the target acceleration for each unit time calculated by the action plan generation unit 15 in consideration of travel resistance determined by a road gradient or the like in the self-drive mode. Then, for example, the actuator AC is feedback controlled so that an actual acceleration detected by the internal sensor group 2 becomes the target acceleration. That is, the actuator AC is controlled so that the subject vehicle travels at the target vehicle speed and the target acceleration. In the manual drive mode, the driving control unit 16 controls each actuator AC in accordance with a travel command (steering operation or the like) from the driver acquired by the internal sensor group 2.

The map generation unit 17 generates the environmental map constituted by three-dimensional point cloud data using detection values detected by the external sensor group 1 during traveling in the manual drive mode. Specifically, an edge indicating an outline of an object is extracted from a captured image acquired by the camera based on luminance and color information for each pixel, and a feature point is extracted using the edge information. The feature point is, for example, an intersection of the edges, and corresponds to a corner of a building, a corner of a road sign, or the like. The map generation unit 17 sequentially plots the extracted feature points on the environment map, thereby generating the environmental map around the road on which the subject vehicle has traveled. The environmental map may be generated by extracting the feature point of an object around the subject vehicle using data acquired by radar or LiDAR instead of the camera.

The subject vehicle position recognition unit 13 performs subject vehicle position estimation processing in parallel with map creation processing by the map generation unit 17. That is, the position of the subject vehicle is estimated based on a change in the position of the feature point over time. The map creation processing and the position estimation processing are simultaneously performed, for example, according to an algorithm of SLAM. The map generation unit 17 can generate the environmental map not only when the vehicle travels in the manual drive mode but also when the vehicle travels in the self-drive mode. If the environmental map has already been generated and stored in the PROCESSING UNIT 12, the map generation unit 17 may update the environment map with a newly obtained feature point.

Now, when the subject vehicle 101 enters an intersection, the subject vehicle 101 determines whether to pass through the stop line, stop at the stop line, or the like in accordance with the display mode of a traffic light corresponding to the travel lane, and generates an action plan based on the determination result. At an intersection IS with multiple traffic lights installed, such as the intersection IS in FIG. 2A, traffic lights other than the traffic light corresponding to the travel lane may be included in the angle of view of the in-vehicle camera of the subject vehicle 101. At the intersection IS, as illustrated in the drawing, two roads (a road with lanes LN1 and LN2 and a road with lanes LN3 and LN4) with one lane on one side of left-hand traffic intersect, and traffic lights SG1, SG2, SG3, and SG4 are installed so as to correspond to the respective lanes. Note that the traffic lights SG1, SG2, SG3, and SG4 are traffic lights configured to be switchable at least between a first display mode (green traffic light) that represents permission to travel and a second display mode (red traffic light) that represents a stop instruction at a stop line. In addition, hereinafter, the travel lane of the subject vehicle 101 may be referred to as a current lane to be distinguished from other lanes.

Figure 2A:
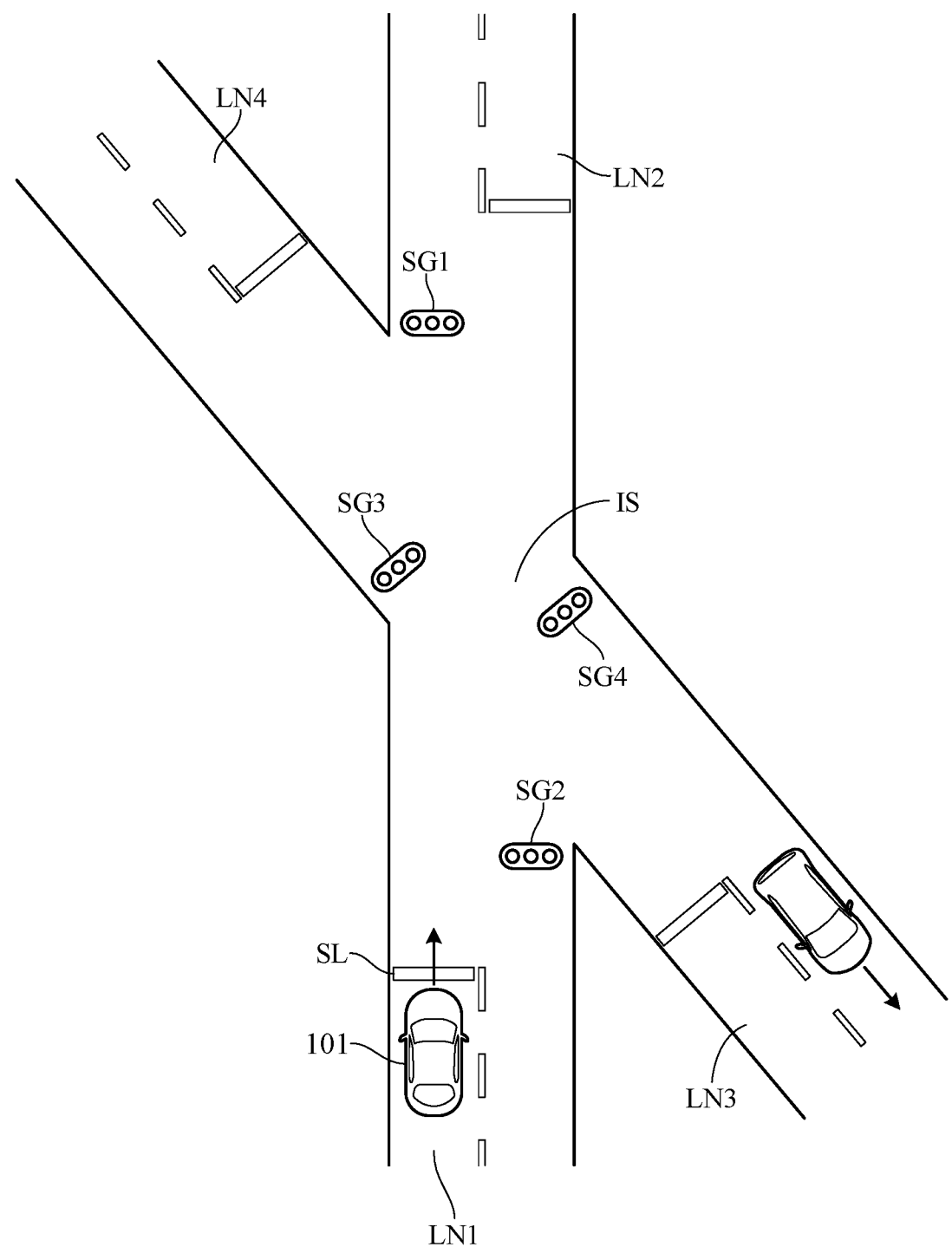
FIG. 2A is a diagram illustrating an example an intersection.
Figure 2B:
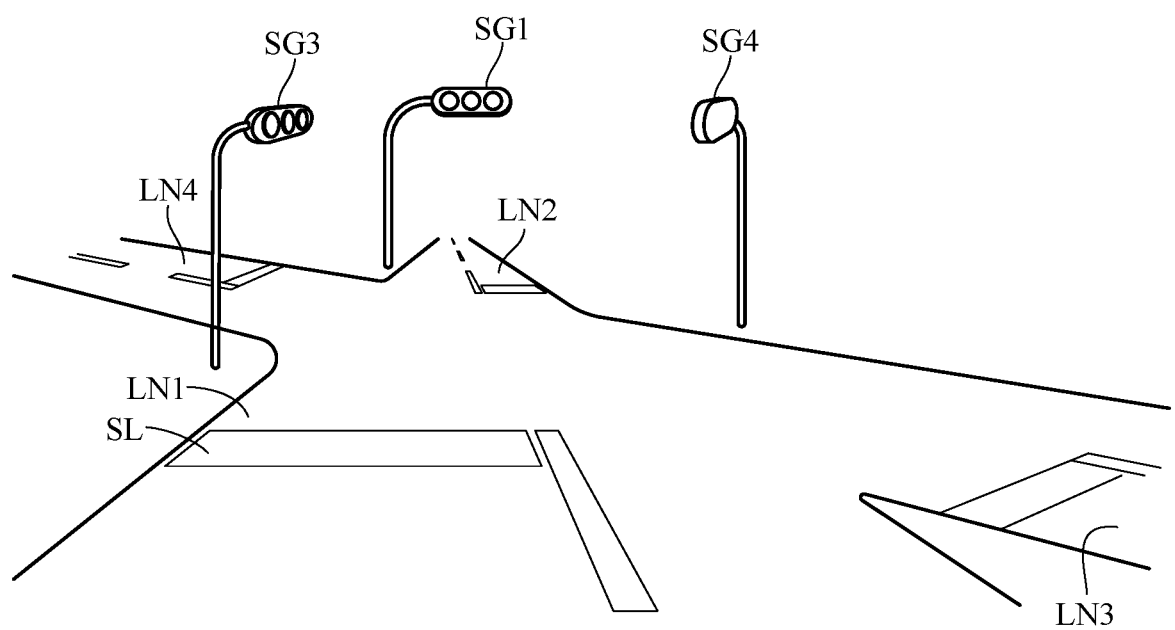
FIG. 2B is a diagram illustrating an example of a captured image acquired by an in-vehicle camera when a vehicle enters the intersection of FIG. 2A.

FIG. 2B is a diagram illustrating an example of a captured image acquired by the in-vehicle camera when the subject vehicle 101 enters the intersection IS. As illustrated in FIG. 2B, when the captured image of the in-vehicle camera includes the plurality of traffic lights SG1, SG3, and SG4, there is a possibility that the subject vehicle 101 may erroneously recognize the traffic light. More specifically, there is a possibility that the subject vehicle 101 may erroneously recognize a traffic light (for example, the traffic light SG3) other than the traffic light SG1 corresponding to the current lane LN1. In particular, there is a high possibility that a traffic light is erroneously recognized at an intersection where two roads obliquely intersect, such as the intersection IS in FIG. 2A, or at an intersection of a multi-forked road such as a five-forked road. As described above, when a traffic light is erroneously recognized, the subject vehicle 101 will not be capable of generating an appropriate action plan.

In this regard, there is a method of generating road information that associates the lane with the traffic light corresponding to the lane, based on the captured image of the in-vehicle camera in the case of the subject vehicle 101 passing through the intersection IS in the past, and recognizing the traffic light corresponding to the current lane, based on the road information, in the case of entering the intersection IS next. In such a method, however, it is necessary to accumulate the past captured images of the in-vehicle camera, and there is a possibility that the capacity of the memory unit 12 will be greatly used. Thus, for dealing with such a problem, a road information generation apparatus is configured as follows according to the present embodiment.

Figure 3:
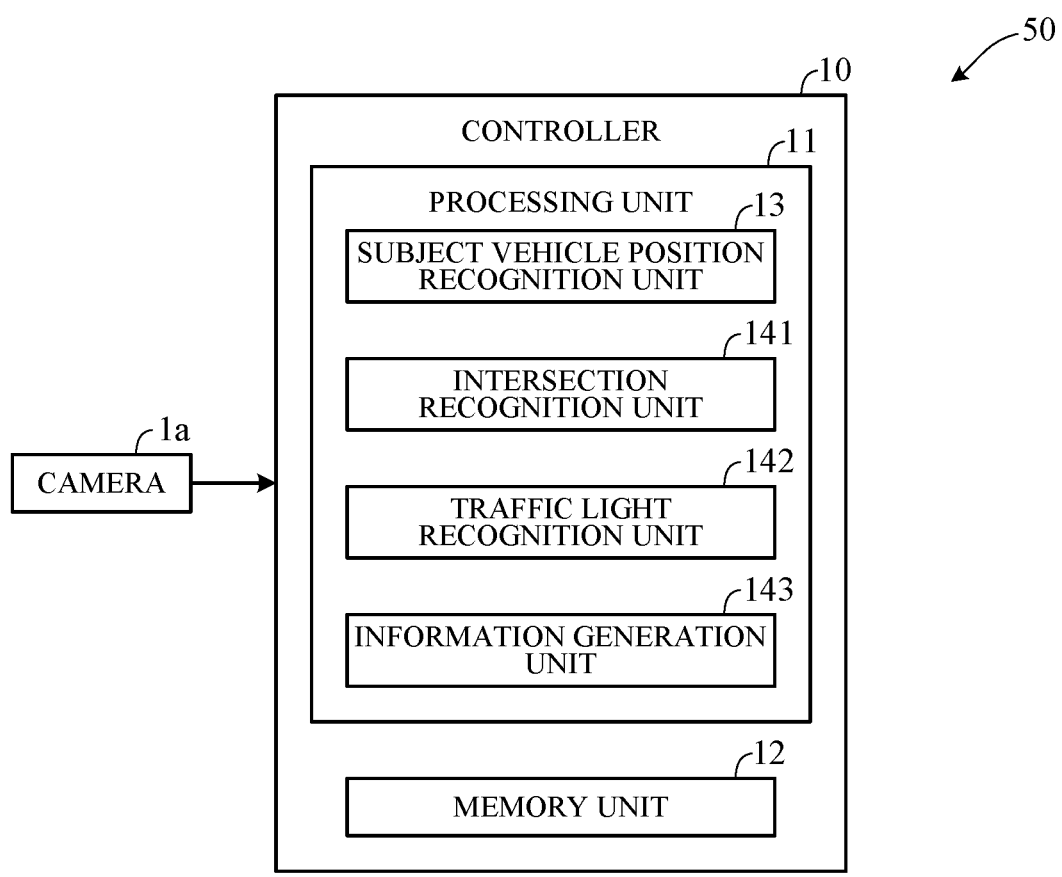
FIG. 3 is a block diagram illustrating a main part configuration of a road information generation apparatus according to an embodiment of the present invention.

FIG. 3 is a block diagram illustrating a main part configuration of a road information generation apparatus 50 according to the embodiment of the present invention. The road information generation apparatus 50 generates road information that associates a lane and a traffic light corresponding to the lane, and constitutes a part of the vehicle control system 100 of FIG. 1. As illustrated in FIG. 3, the road information generation apparatus 50 includes the controller 10 and a camera 1a (hereinafter, also referred to as an imaging unit).

The camera 1a is a monocular camera having an imaging element (image sensor) such as a CCD or a CMOS, and constitutes a part of the external sensor group 1 in FIG. 1. The camera 1a may be a stereo camera. The camera 1a images the surroundings of the subject vehicle 101. The camera 1a is mounted at a predetermined position, for example, in front of the subject vehicle 101, and continuously captures an image of a space in front of the subject vehicle 101 to acquire an image (captured image) of the object.

The road information generation apparatus 50 includes, as a functional configuration undertaken by the processing unit 11, a subject vehicle position recognition unit 13, an intersection recognition unit 141, a traffic light recognition unit 142, and an information generation unit 143. The intersection recognition unit 141, the traffic light recognition unit 142, and the information generation unit 143 are constituted by, for example, the exterior environment recognition unit 14 in FIG. 1. As will be described later, the memory unit 12 stores the recognition result of an object recognized, based on a captured image acquired by the camera 1a to a predetermined time point back from the current time point for a predetermined time PT.

The intersection recognition unit 141 acquires a captured image of the camera 1a. The intersection recognition unit 141 recognizes an intersection ahead in the traveling direction of the subject vehicle 101, based on the captured image of the camera 1a. More specifically, the intersection recognition unit 141 recognizes the structure of the road appearing within the angle of view by an image analysis such as pattern matching, and then determines whether or not the intersection is included within the angle of view. Note that whether or not the intersection is included in the angle of view may be determined by image recognition with the use of machine learning, and other methods may be used for recognizing the intersection.

When the intersection is recognized by the intersection recognition unit 141, the traffic light recognition unit 142 recognizes the travel lane (current lane) of the subject vehicle 101 and the traffic light corresponding to the current lane, installed at the intersection, before the subject vehicle 101 enters the intersection (more specifically, before passing a predetermined distance before the intersection (stop line)), based on the captured image of the camera 1a and the current position of the subject vehicle 101, recognized by the subject vehicle position recognition unit 13.

Specifically, first, the traffic light recognition unit 142 recognizes the current lane, based on the current position of the subject vehicle 101, recognized by the subject vehicle position recognition unit 13, and a division line of a road recognized, based on the captured image. Then, the traffic light recognition unit 142 recognizes the traffic light appearing within the angle of view by an image analysis such as pattern matching, based on the captured image of the camera 1a. Then, the traffic light recognition unit 142 recognizes a traffic light corresponding to the current lane, based on the extending direction of the current lane and the direction of the traffic light. In this regard, in the case where the extending direction of the current lane and the front direction of the traffic light are substantially parallel to each other, that is, in the case where the angle made by the extending direction of the current lane and the front direction of the traffic light falls within a predetermined angle, the traffic light is recognized as the traffic light corresponding to the current lane. Thus, in the example illustrated in FIG. 2B, the traffic light SG1 installed so as to face the front with respect to the current lane LN1 is recognized as the traffic light corresponding to the current lane LN1. In contrast, the traffic lights SG3 and SG4 corresponding to the other lanes LN3 and LN4, installed so as to face an oblique direction with respect to the current lane LN1, are not recognized as the traffic light corresponding to the current lane LN1. Note that the traffic light corresponding to the current lane may be recognized, based on the captured image, with the use of learning data obtained by machine learning (for example, a deep neural network (DNN) or a convolutional neural network (CNN)) in advance about the positional relationship between the lane and the traffic light corresponding to the lane. Accordingly, even in a situation where multiple traffic lights installed within a predetermined angle with respect to the extending direction of the current lane can be recognized from the same angle of view, for example, when a suspension-type traffic light is installed at each lane on a road with multiple lanes on one side, the traffic light corresponding to the current lane can be accurately recognized. In the machine learning mentioned above, a traffic light to be recognized by the subject vehicle 101 may be weighed or the like so as to further improve the recognition accuracy of the traffic light corresponding to the current lane.

The information generation unit 143 generates information (road information) that associates the travel lane recognized by the traffic light recognition unit 142 with the traffic light. The information generation unit 143 stores the generated road information in the memory unit 12 as a part of the highly accurate map information. More specifically, the information generation unit 143 stores the generated road information as information on landmarks (traffic lights, stop lines, and the like) in the highly accurate map information (such as an environmental map) stored in the memory unit 12.

Figure 4:
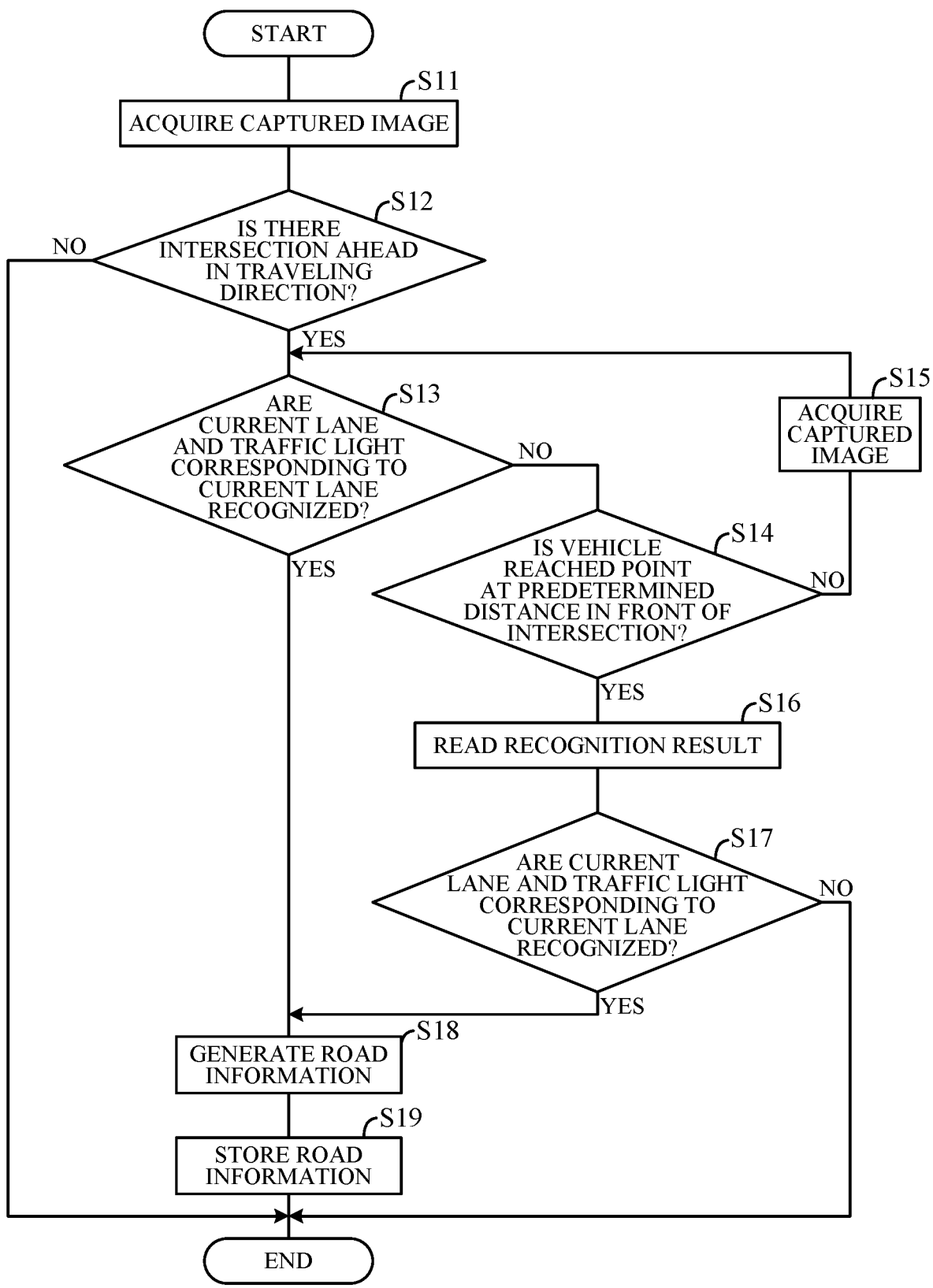
FIG. 4 is a flowchart illustrating an example of processing executed by the controller of FIG. 3.

FIG. 4 is a flowchart illustrating an example of processing executed by the controller 10 of FIG. 3 according to a predetermined program. The processing illustrated in the flowchart is started, for example when the controller 10 is powered on.

First, in step S11, a captured image of the front of the subject vehicle 101 in the traveling direction thereof is acquired, which is acquired by the camera 1a. More specifically, a captured image is acquired, which is output from the camera 1a to the controller 10. In step S12, whether or not an intersection is recognized is determined, based on the captured image acquired in step S11. When the determination is negative in step S12, the recognition result of the object recognized from the captured image acquired in step S11 is stored in the memory unit 12, and the processing is then terminated. The memory unit 12 has only to store therein at least the recognition result of the captured image acquired by the camera 1a to a predetermined time point back from the current time point for the predetermined time PT. Thus, in the case where the recognition result for the predetermined time PT is already accumulated (stored) in the memory unit 12, the oldest recognition result may be deleted from the memory unit 12. The recognition result includes information (encoded information) obtained by encoding, or information (text information) obtained by converting into text, information that represents the condition (position, orientation, or the like) of an object (a division line or stop line of a road, a traffic light, or the like) recognized, based on the captured image. The predetermined time point is, for example, a time point at which the subject vehicle 101 becomes capable of recognizing the intersection, based on the captured image of the camera 1a, that is, a time point at which the determination is affirmative in step S12. Note that a time point at which the subject vehicle 101 is predicted to be capable of recognizing the intersection may be calculated in advance based on map information or the like stored in the map database 5, and a predetermined time point may be set for each intersection, based on the calculation result. More specifically, the predetermined time PT may be set to vary for each intersection.

When the determination is affirmative in step S12, whether or not the current lane (lane LN1 in FIG. 2A) and the traffic light (traffic light SG1 in FIG. 2A) corresponding to the current lane can be recognized is determined in step S13, based on the captured image acquired in step S11 or based on the captured image in the case where the latest captured image is acquired in step S15 described later. Specifically, based on the captured image and the current position of the subject vehicle 101 recognized by the subject vehicle position recognition unit 13, whether or not the current lane and the traffic light corresponding to the current lane can be recognized is determined. If the determination is affirmative in step S13, the processing proceeds to step S18.

Now, when there is any other vehicle (forward vehicle) in front of the subject vehicle 101, a condition in which a division line of a road is hidden by the forward vehicle, that is, so-called occlusion may be caused. In addition, there is a case where a division line of a road may be assimilated into the color of the road by light reflected at the road surface or the like due to a change in sunlight. In addition, there is a case where a division line of a road may blur or disappear due to coating deteriorated. In such a case, the division line of the road fails to be recognized, and thus the current lane fails to be recognized. In addition, in a case where a traffic light at an intersection is hidden by a forward vehicle, or in a case where no traffic light is installed at an intersection where the subject vehicle 101 is going to enter, the traffic light corresponding to the current lane fails to be recognized. If the current lane and the traffic light corresponding to the current lane fails be recognized as described above, the determination is negative in step S13, and the processing proceeds to step S14.

In step S14, whether or not the subject vehicle 101 has reached a point at a predetermined distance in front of the intersection or not is determined. Specifically, whether or not the subject vehicle 101 has reached a point at a predetermined distance in front of the stop line (the stop line SL in FIG. 2A) is determined. If the determination is negative in step S14, the latest captured image is acquired from the camera 1a in step S15. In this case, the processing may proceed to step S15 after a predetermined time interval. Thereafter, the recognition result of the captured image acquired last time is stored in the memory unit 12, and the processing then returns to step S13. In this case, when the recognition result for the predetermined time PT is accumulated (stored) in the memory unit 12, the oldest recognition result may be deleted from the memory unit 12 as described above.

If the determination is affirmative in step S14, the recognition result associated with the captured image acquired to the predetermined time point back from the current time point for the predetermined time PT is read from the memory unit 12 in step S16. In step S17, whether or not the current lane and the traffic light corresponding to the current lane can be recognized, based on the recognition result read in step S16, is determined. In this case, the current lane and the traffic light corresponding to the current lane are recognized, based on the recognition result read in step S16. Each recognition results read in step S16 is a recognition result stored in the memory unit 12 if one or both of the current lane and the traffic light corresponding to the current lane fails to be recognized, and is insufficient information for recognizing both the current lane and the traffic light corresponding to the current lane. The recognition results are, however, collectively treated to recognize, for example, based on the recognition results, the division line of the road and the traffic light, included in the angle of view by image recognition with the use of machine learning, thereby making it possible to recognize the current lane and the traffic light corresponding to the current lane. If the determination is negative in step S17, the processing ends. If the determination is affirmative in step S17, the processing proceeds to step S18.

In step S18, the road information that associates the current lane and the traffic light corresponding to the current lane, recognized in step S13 or step S17, with each other is generated. In step S19, the generated road information is stored in the memory unit 12 as a part of the highly accurate map information, and the processing ends. If the processing ends, the processing is repeated from step S11 at predetermined time intervals. Note that the processing illustrated in the flowchart of FIG. 3 is not executed at least while the subject vehicle 101 is included in the intersection.

According to the embodiment of the present invention, the following advantageous effects can be obtained:

(1) The road information generation apparatus 50 includes: the camera 1a that detects a situation around the subject vehicle 101; the subject vehicle position recognition unit 13 that recognizes the position of the subject vehicle 101; the traffic light recognition unit 142 that recognizes the travel lane of the subject vehicle and a traffic light corresponding to the travel lane of the subject vehicle, installed at an intersection, before the subject vehicle enters the intersection, based on the detection data and the position of the subject vehicle recognized by the subject vehicle position recognition unit 13, when the intersection is recognized ahead in the traveling direction of the subject vehicle, based on the detection data detected by the camera 1a; and the information generation unit 143 that generates road information that associates the traffic light recognized by the traffic light recognition unit 142 with the travel lane of the subject vehicle. For example, based on the detection data detected by the camera 1a, the traffic light recognition unit 142 recognizes, among traffic lights installed at the intersection, a traffic light whose front direction is within a predetermined angle of the extending direction of the travel lane of the subject vehicle+, as a traffic light corresponding to the travel lane of the subject vehicle. In addition, If the position of the subject vehicle 101 recognized by the subject vehicle position recognition unit 13 is included in the intersection, the traffic light recognition unit 142 will not recognize the travel lane of the subject vehicle and the traffic light corresponding to the travel lane of the subject vehicle, installed at the intersection. Accordingly, the road information can be generated without significantly using the capacity of the memory unit 12. In addition, in the case where the subject vehicle enters the next intersection, referring to the above-mentioned road information can prevent traffic lights from being erroneously recognized, and generate an action plan that is suitable for the display mode of the traffic light. Furthermore, the road information is generated, based on the captured image actually acquired when the subject vehicle enters the intersection, thus making it possible to generate road information that is less likely to be affected by changes in the road structure at the intersection, that is, road information with higher robustness.

(2) The road information generation apparatus 50 further includes the memory unit 12 that stores a recognition result associated with detection data of the camera 1*a* between a current time point and a predetermined time point back from the current time point for the predetermined time PT. When the traffic light recognition unit 142 recognizes an object ahead in the traveling direction of the subject vehicle 101, based on the detection data of the camera 1*a*, the traffic light recognition unit 142 stores, in the memory unit 12, a recognition result including information that represents the position and direction of the object. When the traffic light corresponding to the travel lane of the subject vehicle 101 is not recognized, the traffic light recognition unit 142 recognizes the traffic light corresponding to the travel lane, based on the recognition result stored in the memory unit 12, before the subject vehicle 101 enters the intersection. Thus, even when the traffic light corresponding to the current lane is not recognized, based on the current detection data of the camera 1*a*, the traffic light corresponding to the current lane can be recognized. In addition, the recognition result (encoded information or text information) to a predetermined time point back from the current time point for the predetermined time is stored in the memory unit 12, thus making it possible to prevent the capacity of the memory unit 12 from being used more than necessary.

(3) When the travel lane of the subject vehicle 101 is not recognized, the traffic light recognition unit 142 recognizes the travel lane of the subject vehicle, based on the recognition result stored in the memory unit 12, before the subject vehicle 101 enters the intersection. Thus, even when the travel lane of the subject vehicle is not recognized, based on the current detection data of the camera 1*a*, the traffic light corresponding to the current lane can be recognized. In addition, the detection data to a predetermined time point back from the current time point for the predetermined time is stored in the memory unit 12, thus making it possible to prevent the capacity of the memory unit 12 from being used more than necessary.

The above embodiment may be modified into various forms. Some modifications will be described below. According to the embodiment mentioned above, the space in front of the subject vehicle 101 is imaged by the camera 1*a*, but the configuration of the in-vehicle detection unit is not limited to that described above. For example, the in-vehicle detection unit may image the right or left of or a space behind the subject vehicle 101. In addition, the embodiment mentioned above takes, as an example, the configuration in which the travel lane of the subject vehicle or the traffic light corresponding to the travel lane is recognized with the use of the captured image acquired by the camera 1*a*, but the travel lane or the traffic light may be recognized with the use of detection data (three-dimensional point cloud data) acquired by a radar or a LiDAR. More specifically, the in-vehicle detection unit may be any detector other than the camera 1*a*, such as a radar or a LiDAR. In addition, the camera 1*a* may be constituted by a narrow-angle camera or a wide-angle camera. More specifically, the camera 1*a* is constituted by at least one of a narrow-angle camera and a wide-angle camera.

In addition, the case where the subject vehicle enters the intersection with the crossing roads each with one lane on one side is described as an example in the embodiment mentioned above, but the traffic light corresponding to the subject vehicle can be recognized in a similar manner even when the subject vehicle enters an intersection with crossing roads each with multiple lanes on one side. Note that in the case where multiple traffic lights installed within a predetermined angle with respect to the extending direction of the current lane are recognized at an intersection where a traffic light (such as a suspension-type traffic light) is installed on each lane of a road with multiple lanes on one side, the traffic light corresponding to the current lane can be recognized with the use of machine learning such as DNN as described above.

Furthermore, the embodiment mentioned above is adapted such that when the traffic light corresponding to the current lane is not recognized, the travel lane of the subject vehicle is recognized, based on the recognition result stored in the memory unit 12 and associated with the captured image acquired by the camera 1*a*, but the configuration of the traffic light recognition unit is not limited thereto. In the case where the camera 1*a* has a zoom function, the traffic light recognition unit may output a control signal to the camera 1*a* such that zooming out is performed until a traffic light appears within the angle of view of the camera 1*a* if the determination is negative in step S14. In addition, in the case where the camera 1*a* has a function of adjusting the angle of view, the traffic light recognition unit may output a control signal for increasing the angle of view to the camera 1*a* such that a division line of a road and a traffic light are included in the angle of view of the camera 1*a* if the determination is negative in step S14. This makes it easier to recognize the current lane and the traffic light corresponding to the current lane before the subject vehicle enters the intersection.

The present invention also can be configured as a road information generation method including: recognizing a position of the subject vehicle; recognizing a travel lane of the subject vehicle and a traffic light corresponding to the travel lane of the subject vehicle, installed at an intersection, before the subject vehicle enters the intersection, based on the position of the subject vehicle recognized in the recognizing and a detection data detected by the in-vehicle detection unit detecting a situation around a subject vehicle, when the intersection is recognized ahead in a traveling direction of the subject vehicle, based on the detection data detected by the in-vehicle detection unit; and generating a road information associating the traffic light recognized in the recognizing the traffic light with the travel lane of the subject vehicle.

The above embodiment can be combined as desired with one or more of the above modifications. The modifications can also be combined with one another.

The present invention can generate an information which associates a current lane with a traffic light corresponding to the current lane without being greatly used a capacity of a memory device.

Above, while the present invention has been described with reference to the preferred embodiments thereof, it will be understood, by those skilled in the art, that various changes and modifications may be made thereto without departing from the scope of the appended claims.

What is claimed is:
1. A road information generation apparatus comprising:
an in-vehicle detection unit configured to detect a situation around a subject vehicle; and
a microprocessor and a memory connected to the microprocessor, wherein
the microprocessor is configured to perform:
recognizing a position of the subject vehicle;
storing, when an object is recognized ahead in a traveling direction of the subject vehicle based on detection data detected by the in-vehicle detection unit, a recognition result of the object in the memory;

when an intersection is recognized ahead in the traveling direction based on the detection data, recognizing a travel lane of the subject vehicle and a traffic light corresponding to the travel lane, installed at the intersection, before the subject vehicle enters the intersection, based on the detection data and the position of the subject vehicle;

when the traffic light corresponding to the travel lane is not recognized based on the detection data, recognizing the traffic light corresponding to the travel lane before the subject vehicle enters the intersection, based on the recognition result stored in the memory during a period between a current time point and a predetermined time point back from the current time point for a predetermined time; and generating road information associating the traffic light with the travel lane of the subject vehicle.

2. The road information generation apparatus according to claim 1, wherein the microprocessor is configured to perform:

based on the detection data, recognizing, among traffic lights installed at the intersection, a traffic light whose front direction is within a predetermined angle of an extending direction of the travel lane of the subject vehicle, as a traffic light corresponding to the travel lane of the subject vehicle.

3. The road information generation apparatus according to claim 1, wherein the predetermined time point is a time point at which the intersection can be recognized based on the detection data.

4. The road information generation apparatus according to claim 1, wherein the microprocessor is configured to perform the storing including storing, in the memory, the recognition result including information representing a position and direction of the object recognized based on the detection data.

5. The road information generation apparatus according to claim 1, wherein the microprocessor is configured to perform the recognizing the traffic light including not recognizing, when the position of the subject vehicle is included in the intersection, the travel lane of the subject vehicle and the traffic light corresponding to the travel lane of the subject vehicle and installed at the intersection based on the detection data and the position of the subject vehicle.

6. The road information generation apparatus according to claim 1, wherein the in-vehicle detection unit is a camera, and the microprocessor is configured to further perform outputting a control signal for increasing an angle of view to the camera in a case where the traffic light corresponding to the travel lane has not been recognized based on the detection data when the subject vehicle reaches a point at a predetermined distance before the intersection after recognizing the intersection.

7. A road information generation apparatus comprising:

an in-vehicle detection unit configured to detect a situation around a subject vehicle; and a microprocessor and a memory connected to the microprocessor, wherein the microprocessor is configured to perform as:

a subject vehicle position recognition unit configured to recognize a position of the subject vehicle;

a traffic light recognition unit configured to store, when an object is recognized ahead in a traveling direction of the subject vehicle based on detection data detected by the in-vehicle detection unit, a recognition result of the object in the memory, when an intersection is recognized ahead in the traveling direction based on the detection data, recognize a travel lane of the subject vehicle and a traffic light corresponding to the travel lane, installed at the intersection, before the subject vehicle enters the intersection, based on the detection data and the position of the subject vehicle, when the traffic light corresponding to the travel lane is not recognized based on the detection data, recognize the traffic light corresponding to the travel lane before the subject vehicle enters the intersection, based on the recognition result stored in the memory during a period between a current time point and a predetermined time point back from the current time point for a predetermined time; and an information generation unit configured to generate road information associating the traffic light recognized by the traffic light recognition unit with the travel lane of the subject vehicle.

8. The road information generation apparatus according to claim 7, wherein the traffic light recognition unit, based on the detection data, recognizes a traffic light whose front direction is within a predetermined angle of an extending direction of the travel lane of the subject vehicle, as a traffic light corresponding to the travel lane of the subject vehicle, among traffic lights installed at the intersection.

9. The road information generation apparatus according to claim 7, wherein the predetermined time point is a time point at which the intersection can be recognized based on the detection data.

10. The road information generation apparatus according to claim 7, wherein the traffic light recognition unit stores, in the memory, the recognition result including information representing a position and direction of the object recognized based on the detection data.

11. The road information generation apparatus according to claim 7, wherein the traffic light recognition unit does not recognize, when the position of the subject vehicle is included in the intersection, the travel lane of the subject vehicle and the traffic light corresponding to the travel lane of the subject vehicle and installed at the intersection based on the detection data and the position of the subject vehicle.

12. A road information generation method comprising:

recognizing a position of a subject vehicle;

storing, when an object is recognized ahead in a traveling direction of the subject vehicle, based on detection data detected by an in-vehicle detection unit detecting a situation around the subject vehicle, a recognition result of the object in a memory;

when an intersection is recognized ahead in the traveling direction based on the detection data, recognizing a travel lane of the subject vehicle and a traffic light corresponding to the travel lane, installed at the intersection, before the subject vehicle enters the intersection, based on the detection data and the position of the subject vehicle;

when the traffic light corresponding to the travel lane is not recognized based on the detection data, recognizing the traffic light corresponding to the travel lane before the subject vehicle enters the intersection, based on the recognition result stored in the memory during a period between a current time point and a predetermined time point back from the current time point for a predetermined time; and generating road information associating the traffic light with the travel lane of the subject vehicle.

* * * * *